(12) United States Patent
Yamamoto

(10) Patent No.: US 7,535,004 B2
(45) Date of Patent: May 19, 2009

(54) FOURIER TRANSFORM INFRARED SPECTROPHOTOMETER

(75) Inventor: Yoshitake Yamamoto, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 15 days.

(21) Appl. No.: 11/946,318

(22) Filed: Nov. 28, 2007

(65) Prior Publication Data

US 2008/0315103 A1 Dec. 25, 2008

(30) Foreign Application Priority Data

Nov. 28, 2006 (JP) ............................ 2006-320015

(51) Int. Cl.
*G01B 9/02* (2006.01)
*G01J 3/45* (2006.01)
*G01J 3/453* (2006.01)

(52) U.S. Cl. ..................... 250/339.08; 250/339.07; 356/450; 356/451

(58) Field of Classification Search ............. 250/339.07–339.09; 356/450–451
See application file for complete search history.

(56) References Cited

FOREIGN PATENT DOCUMENTS

JP 2858630 B2 11/1995

*Primary Examiner*—David P Porta
*Assistant Examiner*—Casey Bryant
(74) *Attorney, Agent, or Firm*—Sughrue Mion, PLLC

(57) ABSTRACT

Disclosed is a Fourier transform infrared spectrophotometer, which comprises: a main interferometer section including a beam splitter, a fixed mirror, a movable mirror, and a phase plate disposed between the beam splitter and the fixed mirror; a control interferometer section having a quadrature control system for calculating a position of the movable mirror; a center-burst-position detection section operable, based on an input of interference signals and interferograms, to subject respective intensities of the interferograms to an addition processing while correcting a positional deviation of the movable mirror, so as to obtain a cumulative interferogram, and detecting a center burst position having a maximum intensity value in the cumulative interferogram; a center-burst-position storage section operable to store the detected center burst position; and a measurement-start-position determination section operable, based on the stored center burst position, to determine a measurement start position of the movable mirror during the measurement operation.

4 Claims, 9 Drawing Sheets

FOURIER TRANSFORM INFRARED SPECTROPHOTOMETER

BACKGROUND OF THE INVENTION

1. Field of the Invention

The present invention relates to a Fourier transform infrared spectrophotometer (FTIR) designed to control a movable mirror by means of a quadrature control. The FTIR is usable for qualitative and quantitative analyses of a sample and adaptable to a wide range of substances including polymeric and semiconducting materials, irrespective of whether they are organic or inorganic.

2. Description of the Related Art

Generally, a Fourier transform infrared spectrophotometer (FTIR) comprises a main interferometer section for performing a sample measurement operation, and a control interferometer section for instructing the main interferometer section to start data acquisition, and stabilizing a sliding speed of a movable mirror in the main interferometer section. In the control interferometer section, a control system called "quadrature control" is employed to calculate a position of the movable mirror. Specifically, the quadrature control system comprises a phase plate, such as a λ/8 plate, disposed between a beam splitter and a fixed mirror, a polarization beam splitter operable to separate P and S waves from an interference signal combined through the beam splitter, and a detector operable to detect the separated P and S waves, whereby a position of the movable mirror can be calculated from a phase relationship between detection signals indicative of the P and S waves detected by the detector, and respective wavenumbers of the detection signals.

The FTIR also includes a movable-mirror sliding mechanism operable to move the movable mirror close to and away from the beam splitter so as to change a position of the movable mirror. FIGS. 6A and 6B show one example of the movable-mirror sliding mechanism together with the movable mirror swingably hung thereon, wherein FIG. 6A is a vertical sectional view, and FIG. 6B is a left side view. The movable mirror 4 is attached to a base 131 through a mirror holder 134, and the base 131 is swingably attached to two plates 132, 133, each which is swingably attached to a top portion of a body 130 by films 141, 142. The body 130 internally has a magnet 136 and a pole piece 137 which are fastened by a bolt 138 to a plate 135 fixed to the body 130, and associated with a coil 139 fixed to the base 131 through an angle rest 140. The coil 139 is adapted, in response to applying a current thereto, to be moved across a magnetic field formed by the magnet 136 and the pole piece 137. More specifically, when a current is applied to the coil 139, the coil 139 is subjected to a Lorentz force according to a magnetic field from the magnet 136 and the pole piece 137 and thereby moved in a rightward/leftward direction in FIG. 6A. Consequently, the movable mirror 4 is moved in the rightward/leftward direction in FIG. 6A through the base 131. In this manner, the movable mirror 4 is moved close to and away from the beam splitter to change a position thereof relative to the beam splitter.

In the FTIR having the movable-mirror sliding mechanism as shown in FIG. 6, if a mounting base of the body 130 improperly inclines, respective distances between the movable mirror 4 and the beam splitter and between the fixed mirror and the beam splitter will become different from each other when the movable mirror 4 is located at a gravitationally balanced position (i.e., an initial position of the movable mirror 4 as shown in FIG. 6A), while, on the other hand, a center burst which has a maximum intensity value in an interferogram obtained by moving the movable mirror 4 during an adjustment operation will be detected when the above two distances become equal to each other, i.e., at a position in the interferogram deviated from that corresponding to the gravitationally balanced position. FIG. 7 shows one example of the interferogram in the above situation, wherein the horizontal axis represents a position of the movable mirror 4, and the vertical axis represents an intensity value. During a sample measurement operation after the above adjustment operation, the movable mirror 4 is moved in a moving range having a center set at the detected position (−L) of the center burst (hereinafter referred to as "center burst position").

The operations of detecting a center burst position and measuring a sample in the conventional FTIR will be more specifically described below. FIG. 8 is an explanatory diagram of these operations, wherein a position of the movable mirror 4 is indicated in a lateral (rightward/leftward) direction, and the rightward and leftward directions are defined as (+) and (−) directions, respectively.

First of all, the movable mirror 4 is set at a gravitationally balanced position (1), and positional data of the movable mirror 4 is initialized. Subsequently, the movable mirror 4 is slidingly moved from the gravitationally balanced position (1) to a position (3) by a distance corresponding to a wavenumber resolution of 2 cm$^{-1}$ (about −2.5 mm; the number of measurement points=8192 points) as indicated by an arrow (2), and then the sliding direction is reversed. Then, the movable mirror 4 is slidingly moved over a moving range (4) for obtaining a wavenumber resolution of 2 cm$^{-1}$ (about 5 mm; the number of measurement points=16384 points), and an operation of acquiring data for a center burst position is performed during a period of this sliding movement. A position where an interferogram obtained in the moving range (4) has a maximum intensity value is calculated and detected as a center burst position (−L). Then, when the movable mirror 4 is located at a position (6), a measurement start position is calculated to allow a sample measurement operation to be performed in a moving range symmetrically about the detected center burst position (−L) with a designated wavenumber resolution. If the measurement start position is determined as a position (7), the movable mirror 4 is slidingly moved to the position (7), and then the sliding direction is reversed to perform a 1st operation of acquiring sample data in a moving range (8). Subsequently, 2nd to n-th operations of acquiring sample data will be sequentially performed in the moving range (8) having a measurement start position set at the position (7).

As above, a position having a maximum intensity value in an interferogram obtained by moving the movable mirror 4 in a predetermined moving range having a center set at the gravitationally balanced position (1) is detected as a center burst position (−L). However, if a surface of a support base mounting the FTIR thereon largely inclines relative to a proper position, the center burst position (−L) will be largely deviated from a position in the interferogram corresponding to the gravitationally balanced position (1) to cause difficulty in accurately detect the center burst position (−L). Although the moving range of the movable mirror 4 may be pre-set at a larger value to avoid the above situation, this approach involves a problem about an increase in time for the adjustment operation of moving the movable mirror 4 to detect a center burst position (−L), particularly, when considering that the adjustment operation has to be performed every time a sample is changed. With a view to solving this problem, there has been disclosed an FTIR designed to perform a pre-adjustment operation of moving a movable mirror 4 in a relatively wide moving range to detect a center burst position (−L) and storing the detected center burst position in a storage device, such as a nonvolatile memory, and then, in a sample measurement operation, initially perform a fine-adjustment operation of moving the movable mirror 4 in a relatively narrow moving range having a center set at the stored center burst position so as to finely adjust the center burst position (see, for example, Japanese Patent No. 2858630).

In reality, during an operation of detecting a center burst position (−L), a light intensity reaching a detector is likely to become insufficient, depending on a measurement technique (e.g., reflection measurement) or a type of sample. As a result, an interferogram will have a low intensity at a center burst position (−L) as shown in FIG. 9. This means that a center burst position (−L) is liable to be buried by noises, or a noise peak is liable to be erroneously recognized as a center burst.

SUMMARY OF THE INVENTION

In view of the above circumstances, it is an object of the present invention to provide a Fourier transform infrared spectrophotometer capable of accurately detect a center burst position even when a sufficient light intensity does not reach a detector.

In order to achieve this object, the present invention provides a Fourier transform infrared spectrophotometer which comprises: a main interferometer section operable to perform a sample measurement operation, wherein the main interferometer section includes a beam splitter, a fixed mirror, a movable mirror, and a phase plate disposed between the beam splitter and either one of the fixed and movable mirrors; a control interferometer section having a quadrature control system for separating two types of polarization components from an interference signal combined through the beam splitter, and detecting the separated polarization components so as to calculate a position of the movable mirror based on a phase relationship between the detection signals and respective wavenumbers of the detection signals; means for hangingly supporting the movable mirror in such a manner as to set an initial position of the movable mirror at a gravitationally balanced position; a center-burst-position detection section operable, based on an input of a plurality of interference signals from the control interferometer section and a plurality of interferograms from the main interferometer section, to subject respective intensities of the interferograms to an addition processing while correcting a positional deviation of the movable mirror in each of the interferograms, so as to obtain a cumulative interferogram, and detecting a center burst position having a maximum intensity value in the cumulative interferogram; a center-burst-position storage section operable to store the detected center burst position; and a measurement-start-position determination section operable, based on the center burst position stored in the center-burst-position storage section, to determine a measurement start position of the movable mirror during the measurement operation.

In the Fourier transform infrared spectrophotometer of the present invention, the center-burst-position detection section performs the addition processing of adding respective intensities of a designated number of interferograms, to produce a cumulative interferogram. In each of the interferograms, peaks around a center burst position (i.e., center and side bursts) appear in the approximately same pattern. Thus, intensities of the center and side bursts become larger as the number of interferograms subjected to the addition processing is increased. In contrast, noise peaks in each of the interferograms do not appear in the same pattern. Thus, even if the addition processing is performed, intensities of the noise peaks in the interferograms will be cancelled out and kept from being increased. In addition, a positional deviation between the center bursts in the interferograms can be calculated, because peaks around a center burst position appear in the approximately same pattern, as described above. That is, in a process of producing the cumulative interferogram, the addition processing can be performed while correcting a positional deviation of the center burst in each of the interferograms. This makes it possible to accurately detect a center burst position where the cumulative interferogram has a maximum intensity value. Thus, even if a light transmittance becomes low due to a high sample concentration, or light intensity to be reflected toward a detector becomes low due to an increase in light scattering during reflection measurement, a center burst position can be accurately detected without occurrence of undesirable situations where a center burst position is buried by noises, or a noise peak is erroneously recognized as a center burst.

Then, the detected center burst position is stored in the center-burst-position storage section. In the measurement operation, the measurement-start-position determination section will determine a measurement start position based on the center burst position stored in the center-burst-position storage section.

One specific example of a pre-adjustment operation of detecting a center burst position in the Fourier transform infrared spectrophotometer (FTIR) of the present invention will be described below. FIG. 1A is an explanatory diagram of the pre-adjustment operation, wherein a position of the movable mirror is indicated in a lateral (rightward/leftward) direction, and the rightward and leftward directions are defined as (+) and (−) directions, respectively.

First of all, positional data of the movable mirror is initialized (i.e., reset to "0") under the condition that the movable mirror is stopped at a gravitationally balanced position (1). Subsequently, the movable mirror is slidingly moved by a distance from the gravitationally balanced position (1) to a position (3) (about −5 mm; the number of measurement points=16384 points), and then the sliding direction is reversed. Then, the movable mirror is slidingly moved over a moving range (4)-1 for obtaining a wavenumber resolution of 1 cm$^{-1}$ (about 10 mm; the number of measurement points=32768 points), so as to perform a 1st operation of acquiring data for detecting a center burst position, during a period of this sliding movement. That is, during the data acquisition operation, the movable mirror is moved in the relatively wide moving range corresponding to a wavenumber resolution of 1 cm$^{-1}$ (about ±5 mm).

Then, after reversing the sliding direction at a position (5), the movable mirror is moved to a position (3), and the sliding direction is re-reversed. Further, the movable mirror is slidingly moved over a moving range (4)-2 for obtaining a wavenumber resolution of 1 cm$^{-1}$ (about 10 mm; the number of measurement points=32768 points), so as to perform a 2nd operation of acquiring data for detecting a center burst position, during a period of this sliding movement.

Then, an addition processing of adding intensities of an interferogram obtained in the moving range (4)-1 and intensities of an interferogram obtained in the moving range (4)-2 is performed. During reversing of the sliding direction of the movable mirror, positional data of the movable mirror to be obtained according to the quadrature control system is likely to have an error. In this case, even if intensities of an interferogram obtained in the moving range (4)-1 and intensities of an interferogram obtained in the moving range (4)-2 are directly added together, the cumulative interferogram as set forth in the present invention cannot be obtained. Thus, the center-burst-position detection section performs the addition processing while correcting a positional deviation of the movable mirror in each of the interferograms.

Then, a position where a cumulative interferogram obtained through the addition processing has a maximum intensity value is calculated and detected as a center burst position (−L). The detected center burst position (−L) is stored in the center-burst-position storage section, such as an electrically erasable programmable read-only memory (EE-PROM).

One specific example of a fine-adjustment operation of finely adjusting the stored center burst position (−L) so as to perform a sample measurement operation based on a finely-adjusted center burst position will be described below. FIG. 1B is an explanatory diagram of the fine-adjustment operation, wherein a position of the movable mirror is indicated in a lateral (rightward/leftward) direction, and the rightward and leftward directions are defined as (+) and (−) directions, respectively.

First of all, positional data of the movable mirror 4 is initialized (i.e., reset to "0") under the condition that the movable mirror 4 is stopped at the gravitationally balanced position (1). Then, the center burst position (−L) stored in the center-burst-position storage section is read out. Subsequently, the movable mirror is slidingly moved from the gravitationally balanced position (1) to a position (3) which is determined to allow a distance between the read center burst position (−L) and the position (3) to be equal to a distance corresponding to a wavenumber resolution of 4 cm$^{-1}$, and then the sliding direction is reversed. Then, the movable mirror is slidingly moved over a moving range (4) for obtaining a wavenumber resolution of 4 cm$^{-1}$ (about 4 mm; the number of measurement points=8192 points), and an operating of acquiring data for finely adjusting the read (i.e., stored) center burst position is performed during a period of this sliding movement.

Then, when the movable mirror is located at a position (5), a position where an interferogram obtained in the moving range (4) has a maximum intensity value is calculated and detected as a finely-adjusted center burst position (−L'). This finely-adjusted center burst position (−L') is not so largely different from the center burst position (−L) detected through the pre-adjustment operation and stored in the center-burst-position storage section. Thus, in the fine-adjustment operation, the movable mirror is moved in a moving range approximately equal to or less than that for a sample measurement operation. For example, the movable mirror is moved in a narrow moving range corresponding to a wavenumber solution of 4 cm$^{-1}$ (about ±2 mm).

Then, when the movable mirror is located at a position (6), a measurement start position is calculated to allow the sample measurement operation to be performed in a moving range having a center set at the finely-adjusted center burst position (−L') with a designated wavenumber resolution. If the measurement start position is determined as a position (7), the movable mirror is slidingly moved to the position (7), and then the sliding direction is reversed to perform a 1st operation of acquiring sample data in a moving range (8). Subsequently, 2nd to n-th operations of acquiring sample data will be sequentially performed in the moving range (8) having a measurement start position set at the position (7).

In the Fourier transform infrared spectrophotometer of the present invention, the plurality of interference signals and the plurality of interferograms may be obtained during a pre-adjustment operation and input into the center-burst-position determination section, respectively, from the control interferometer section and the main interferometer section.

In the Fourier transform infrared spectrophotometer of the present invention, the center-burst-position storage section may store an intensity threshold for an interferogram. In this case, the Fourier transform infrared spectrophotometer may include a center-burst-position fine adjustment section operable to perform a fine-adjustment operation in conjunction with the sample measurement operation, so as to obtain an interferogram, and re-calculate a center burst position based on the intensity threshold, and intensities of the obtained interferogram.

For example, in this Fourier transform infrared spectrophotometer according to a specific embodiment of the present invention, when a maximum intensity value in an interferogram obtained through the fine-adjustment operation is less than the intensity threshold stored in the center-burst-position storage section, it is determined that a center burst position cannot be normally detected through the fine-adjustment operation, and a result of the fine-adjustment operation can be invalidated. In this case, the sample measurement operation will be performed based on the center burst position stored in the center-burst-position storage section. This makes it possible to prevent the sample measurement operation from being performed in an abnormal moving range of the movable mirror.

Alternatively, the Fourier transform infrared spectrophotometer of the present invention may include a center-burst-position fine-adjustment section operable, in conjunction with the sample measurement operation, to perform a fine-adjustment operation of obtaining an interferogram, defining a search range for searching a center burst position in the obtained interferogram, and re-calculating a center burst position based on intensities in a specific region of the interferogram corresponding to said search range.

A center burst position to be finely adjusted through the fine-adjustment operation is not so largely different from the center burst position stored in the center-burst-position storage section, as mentioned above. Thus, for example, in this Fourier transform infrared spectrophotometer according to a specific embodiment of the present invention, the search range is defined in such a manner as to set a center thereof at the center burst position stored in the center-burst-position storage section, and a position where a specific region of the interferogram corresponding to the search range has a maximum intensity value is detected as a new center burst position for performing the sample measurement operation.

DETAILED DESCRIPTION OF THE EMBODIMENTS

With reference to the drawings, an embodiment of the present invention will now be described.

Figure 2:
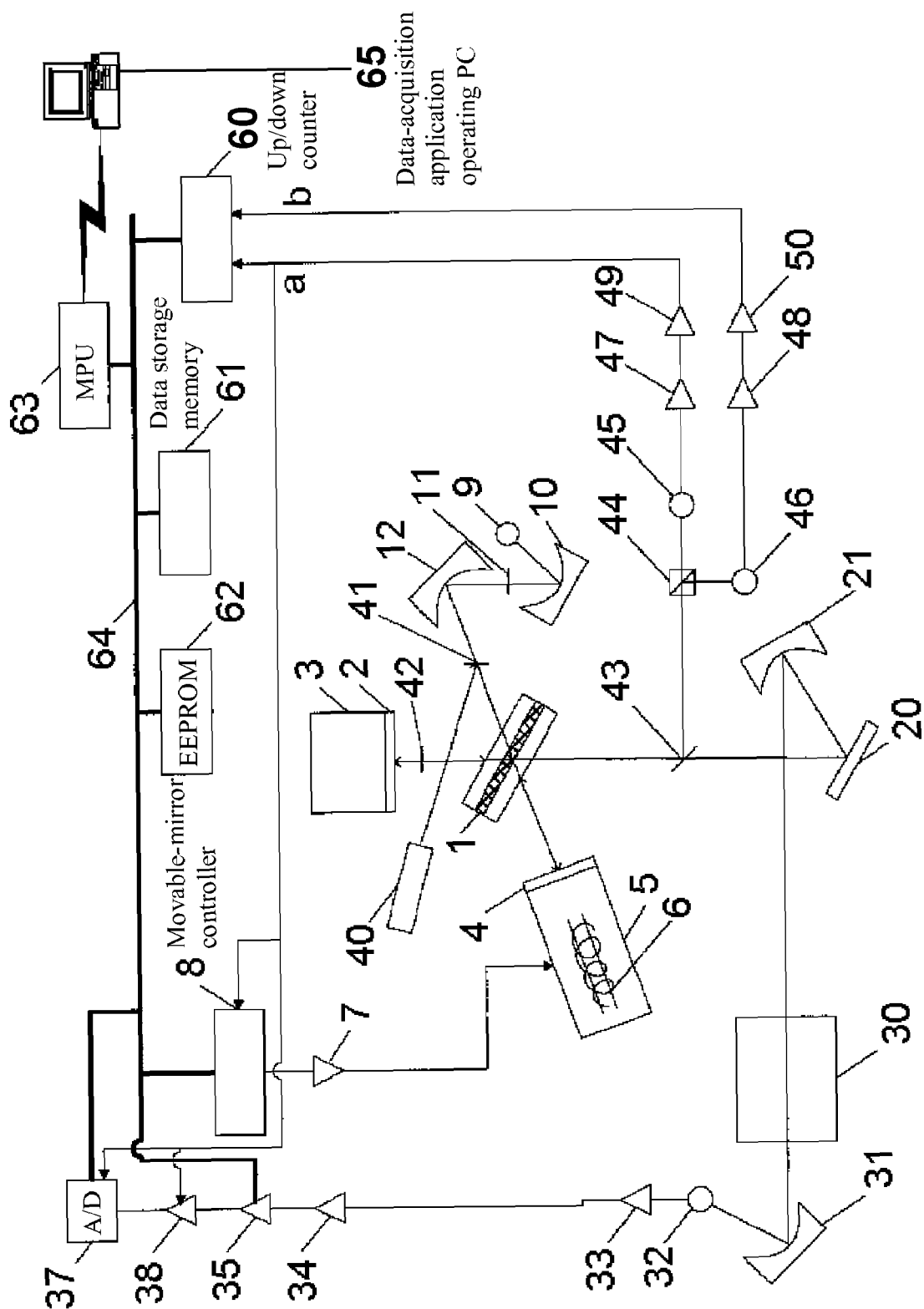
FIG. 2 is a schematic diagram generally showing an FTIR according to one embodiment of the present invention.

FIG. 2 is a schematic diagram generally showing a Fourier transform infrared spectrophotometer (FTIR) according to one embodiment of the present invention. As shown in FIG. 2, a beam splitter 1 is disposed to have an inclination of 30 degrees relative to a direction of a normal line of a fixed mirror 2 and a direction of a normal line of a movable mirror 4. The fixed mirror 2 is mounted to a fixed-mirror support block 3. The movable mirror 4 is supported by a sliding mechanism 5, in such a manner as to be moved close to and away from the beam splitter 1 along the direction of the normal line thereof according to a linear motor 6 of the sliding mechanism 5. A power amplifier 7 is provided as a means to apply a certain current to the linear motor 6, and a movable-mirror controller 8 is provided as a means to control a voltage to be applied to the linear motor 6 through the power amplifier 7 in such a manner that a frequency of a detection signal of an after-mentioned photodiode 45 is maintained at a constant value.

An infrared light source 9 is provided as a light source for making up a main interferometer section in cooperation with the beam splitter 1, the fixed mirror 2 and the movable mirror 4 so as to achieve an infrared spectrophotometric function. Infrared light from the infrared light source 9 enters the beam splitter 1 through a converging mirror 10, an aperture 11 and a collimator mirror 12, so that the infrared light is modulated by the main interferometer section. Then, after passing through a mirror 20, a conversing mirror 21 and a sample chamber 30, the modulated light is received by an infrared detector 32 through an ellipsoidal mirror 31, and converted to an electric signal (detection signal). Subsequently, the electric signal (detection signal) detected by the infrared detector 32 is amplified by a preamplifier 33, and noises in the amplified signal are removed by a filter 34. The filtered analog (electric) signal is converted to a digital signal by an A/D converter 37. An auto-gain amplifier 35 and a sample and hold amplifier 38 are also provided between the filter 34 and the A/D converter 37.

An He—Ne laser 40 is provided as a light source for making up a control interferometer section in cooperation with the beam splitter 1, the fixed mirror 2 and the movable mirror 4. A laser beam from the He—Ne laser 40 enters the beam splitter through a half mirror 41. A λ/8 plate 42 is disposed between the beam splitter 1 and the fixed mirror 2 to allow a component of the laser beam reflected by the beam splitter 1 and returned to the beam splitter 1 after being reflected by the fixed mirror 2, to be changed to circularly-polarized light. The λ/8 plate 42 is disposed to have a polarizing axis inclined by 45 degrees relative to a polarization plane of the incident component of the laser beam.

Interference light modulated by the control interferometer section is input into a polarization beam splitter 44 through a half mirror 43. The polarization beam splitter 44 is provided as a means to divide the interference light into polarization components consisting of a P wave and an S wave. A photodiode 45 serves as a detector for receiving one of the polarization components which is transmitted through the polarization beam splitter 44, and a photodiode 46 serves as a detector for receiving the other polarization component reflected by the polarization beam splitter 44. The photodiode 45 is connected to a preamplifier 47, and the photodiode 46 is connected to a preamplifier 48. A signal from each of the preamplifiers 47, 48 is input into a corresponding one of two waveform shapers 49, 50, and converted to a pulse train (pulse signal) therethrough. The two types of pulse trains (pulse signals) "a", "b" from the waveform shapers 49, 50 are input into an up/down counter 60.

In the above process, if the movable mirror 4 is being moved close to the beam splitter 1, the pulse signal "a" has a phase which is advanced relative to that of the pulse signal "b" by 90 degrees. If the movable mirror 4 is being moved away from the beam splitter 1, the pulse signal "a" has a phase which is delayed relative to that of the pulse signal "b" by 90 degrees. Further, each of the pulse signals has a pulse number which is dependent on a position of the movable mirror 4.

The up/down counter 60 is operable to select one of count-up and count-down modes based on a phase relationship between the two pulse signals input thereto, and count respective pulse numbers of the pulse signals according to the selected mode. Then, the up/down counter 60 is operable, in response to a request from a microprocessor unit (MPU) 63, to send the obtained data to the MPU 63.

The pulse signal "a" from the waveform shaper 49 is also sent to each of the movable-mirror controller 8, the sample and hold amplifier 36 and the A/D converter 37, and used as a trigger signal for control of the movable mirror 4 and the A/D conversion of the detection signal.

Each of the MPU 63, a data storage memory 61, an EEPROM 62, the movable-mirror controller 8, the auto-gain amplifier 35, the A/D converter 37 and the up/down counter 60 is connected to a CPU bus line 64. The MPU 63 is connected to a data-acquisition application operating PC 65 through communication means, such as a universal serial bus (USB). Thus, the MPU 63 is operable to execute various processings according to an instruction signal from the data-acquisition application operating PC 65.

Figure 3:
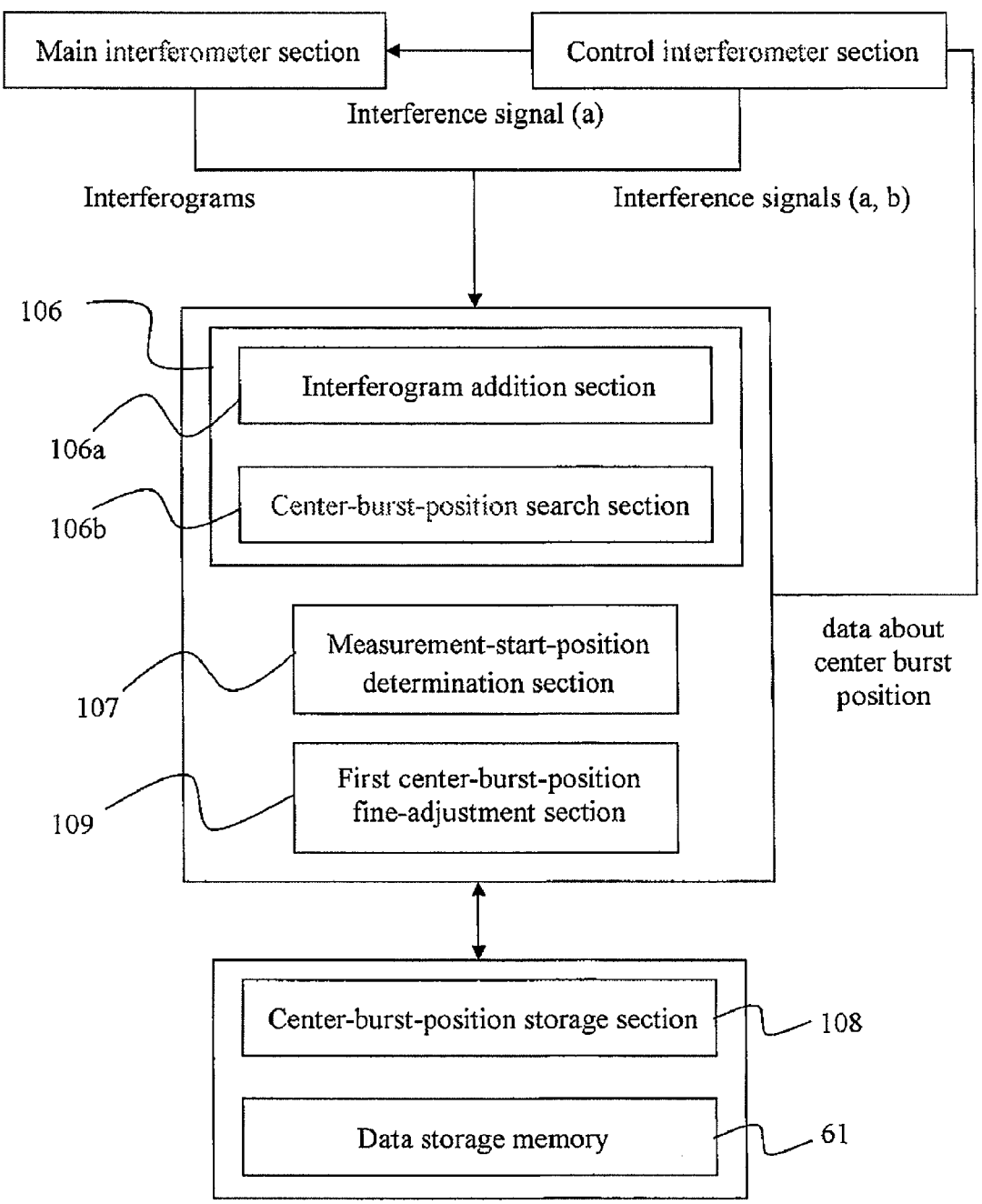
FIG. 3 is a block diagram showing a part of the configuration of the FTIR according to the embodiment.

FIG. 3 is a block diagram showing a part of the configuration of the FTIR 100.

With reference to FIG. 3, a processing function of the FTIR 100 will be described with respect to each functional block. The FTIR functionally comprises a center-burst-position detection section 106, a measurement-start-position determination section 107, a first center-burst-position fine-adjustment section 109, a center-burst-position storage section 108 and a data storage memory 61. The center-burst-position detection section 106 includes an interferogram addition section 106a and an interferogram search section 106b.

The center-burst-position detection section 106, the measurement-start-position determination section 107 and the first center-burst-position fine-adjustment section 109 are achieved by the MPU 63, and the center-burst-position storage section 108 is achieved by the EEPROM 62.

A data acquisition operation in the FTIR 100 will be described below.

As mentioned above, infrared light emitted from the infrared light source 9 and moderated by the main interferometer section is sent to the infrared detector 32 through the sample chamber 30 and converted to an electric (analog) signal by the infrared detector 32. The electric signal is sent to the sample and hold amplifier 36 through the preamplifier 33, the filter 34 and the auto-gain amplifier 35, and sampled by the sample and hold amplifier 36. Then, the sampled analog signal is converted to a digital signal by the A/D converter 37, and the digital signal is introduced into the CPU bus line 64. In this process, the pulse signal "a", i.e., an interference signal from the control interferometer section, is used for activating the A/D conversion of the A/D converter 37. Further, an actual position of the movable mirror 4 is detected in real time based on the quadrature control system. Then, positional data of the movable mirror produced by the up/down counter 60 are sequentially recognized by the MPU 63, so as to determine a measurement start position and a measurement end position for acquiring data about an interferogram. In this manner, along with a movement of the movable mirror 4, an interferogram is produced, and data about the interferogram is acquired.

Figure 1A:
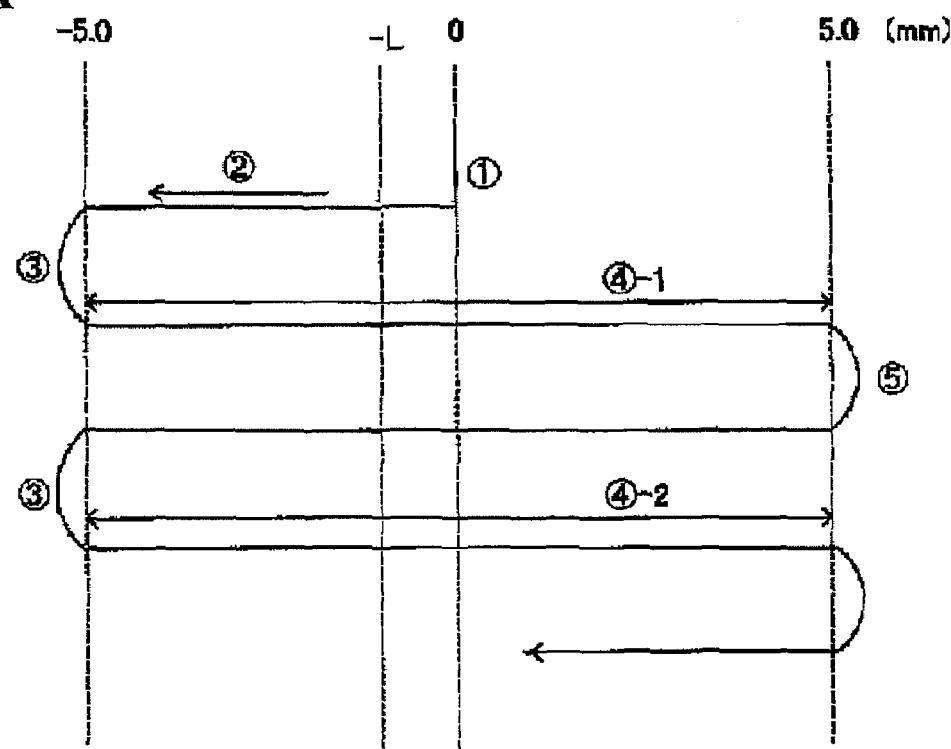
FIGS. 1A and 1B are explanatory diagrams showing one example of an operation of detecting a center burst position in a Fourier transform infrared spectrophotometer (FTIR) of the present invention.
Figure 4:
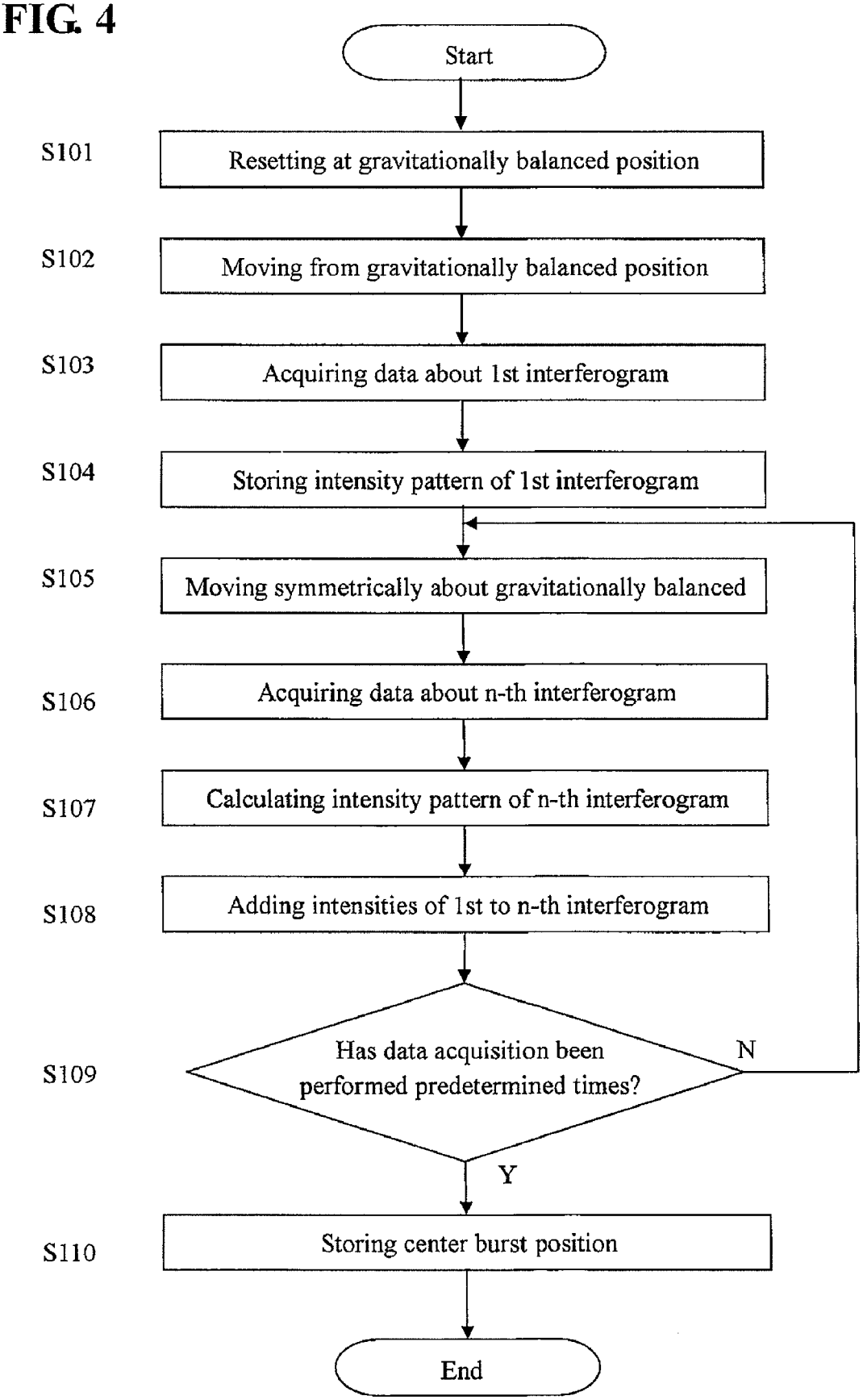
FIG. 4 is an explanatory flowchart of a pre-adjustment operation in the FTIR according to the embodiment.

An operation of the FTIR 100 when a sample is measured in a mid-infrared region will be described. The operation of the FTIR 100 includes a pre-adjustment operation and a sample measurement operation. The pre-adjustment operation will be firstly described below with reference to FIG. 4 and FIG. 1A. FIG. 4 is an explanatory flowchart of the pre-adjustment operation in the FTIR 100 according to the embodiment. When the MPU 63 receives an instruction signal for performing the pre-adjustment operation from the data-acquisition application operating PC 65, the routine illustrated in this flowchart is called and executed by the MPU 63, as one processing to be performed during a new installation of the FTIR 100 or during a maintenance operation of the main interferometer section.

In Step S101, positional data of the movable mirror managed by the up/down counter 60 is initialized (i.e., reset to "0") under the condition that the movable mirror 4 is stopped at a gravitationally balanced position (1).

Subsequently, in Step S102, the movable mirror 4 is slidingly moved away from the beam splitter 1 (in the (−) direction) by a sum of a distance corresponding to a wavenumber resolution of 1 $cm^{-1}$ (about −5 mm; a count value in the up/down counter (i.e., up/down counter value)=16384 points) and a distance for stably reversing the sliding direction (up/down counter value=500 points). Thus, when the movable mirror 4 is slidingly moved by a distance corresponding to an up/down counter value of 16884 points, the sliding direction is reversed.

Then, in Step S103, the movable mirror 4 is slidingly moved over a distance (4)-1 corresponding to a wavenumber resolution of 1 $cm^{-1}$ (about 10 mm; an up/down counter value=32768 points), so as to perform a 1st operation of acquiring data for detecting a center burst position. In conjunction with the 1st data acquisition operation, when the sliding direction is fully reversed and the up/down counter value reaches 16384 points in the (−) direction, the measurement-start-position determination section 107 starts storing data converted by the A/D converter 37, in a sampling buffer area of the data storage memory 61.

Then, in Step S104, the movable mirror 4 is slidingly moved until the up/down counter value reaches 16884 points in the (−) direction after the sliding direction is fully reversed at a position (5), and the interferogram addition section 106a copies data stored in the sampling buffer area of the data storage memory 61, into an addition buffer area of the data storage memory 61. The interferogram addition section 106a also calculates a 1st candidate center burst position (a position where a 1st interferogram obtained during the 1st data acquisition operation has a maximum intensity value) and an intensity pattern of the 1st interferogram in a predetermined range having a center set at the 1st candidate center burst position, and stored the calculated data in an addition buffer area.

Then, in Step S105, when the movable mirror 4 is re-moved to a position corresponding to an up/down counter value of 16884 points in the (−) direction, the sliding direction is reversed.

Then, in Step S106, the movable mirror 4 is slidingly moved over a distance (4)-2 corresponding to a wavenumber resolution of 1 $cm^{-1}$ (about 10 mm; an up/down counter value=32768 points), so as to perform an n-th operation of acquiring data for detecting a center burst position (wherein n is a positive integer equal to or greater than "2"). In conjunction with the n-th data acquisition operation, when the sliding direction is fully reversed and the up/down counter value reaches 16384 points in the (−) direction, the measurement-start-position determination section 107 starts storing data converted by the A/D converter 37, in the sampling buffer area of the data storage memory 61.

Then, in Step S107, the movable mirror 4 is slidingly moved after the sliding direction is fully reversed, and the interferogram addition section 106a calculates an n-th candidate center burst position (a position where an n-th interferogram obtained during the n-th data acquisition operation has a maximum intensity value) and an intensity pattern of the n-th interferogram in a predetermined range having a center set at the n-th candidate center burst position.

Then, in Step S108, the interferogram addition section 106a compares the intensity pattern of the 1st interferogram in a predetermined range having a center set at the 1st candidate center burst position, with the intensity pattern of the n-th interferogram in a predetermined range having a center set at the n-th candidate center burst position, to calculate a positional deviation of the movable mirror based on regions in the 1st and n-th interferograms having the most similar intensity pattern. Then, in the addition buffer area, the interferogram addition section 106a shifts a phase of data (1st or n-th interferogram) stored in the sampling buffer area of the data storage memory 61, by the calculated positional deviation of the movable mirror. The interferogram addition section 106a then performs a processing of adding intensities of the 1st to n-th interferograms to produce a cumulative interferogram. A candidate center burst position in the cumulative interferogram and an intensity pattern of the cumulative interferogram in a predetermined range having a center set at the candidate center burst position are stored in the addition buffer area.

Then, in Step S109, it is determined whether the number of data acquisition operations (or the addition processions) reaches a predetermined value. If it is determined that the number of data acquisition operations does not reach the predetermined value, the routine will return to Step S105.

When it is determined that the number of data acquisition operations reaches the predetermined value, the interferogram search section 106b searches a center burst position from the cumulative interferogram stored in the addition buffer area, and stores the searched center burst position (−L) and an intensity threshold for a center burst position in the EEPROM 62 serving as the center-burst-position storage section 108, in Step S110. The MPU 63 may be configured to send the cumulative interferogram to the data-acquisition application operating PC 65 so as to allow the cumulative interferogram to be stored in a hard disk (HDD) and displayed on a display unit of the data-acquisition application operating PC 65.

After completion of the processing in Step S110, the routine is terminated.

Figure 1B:
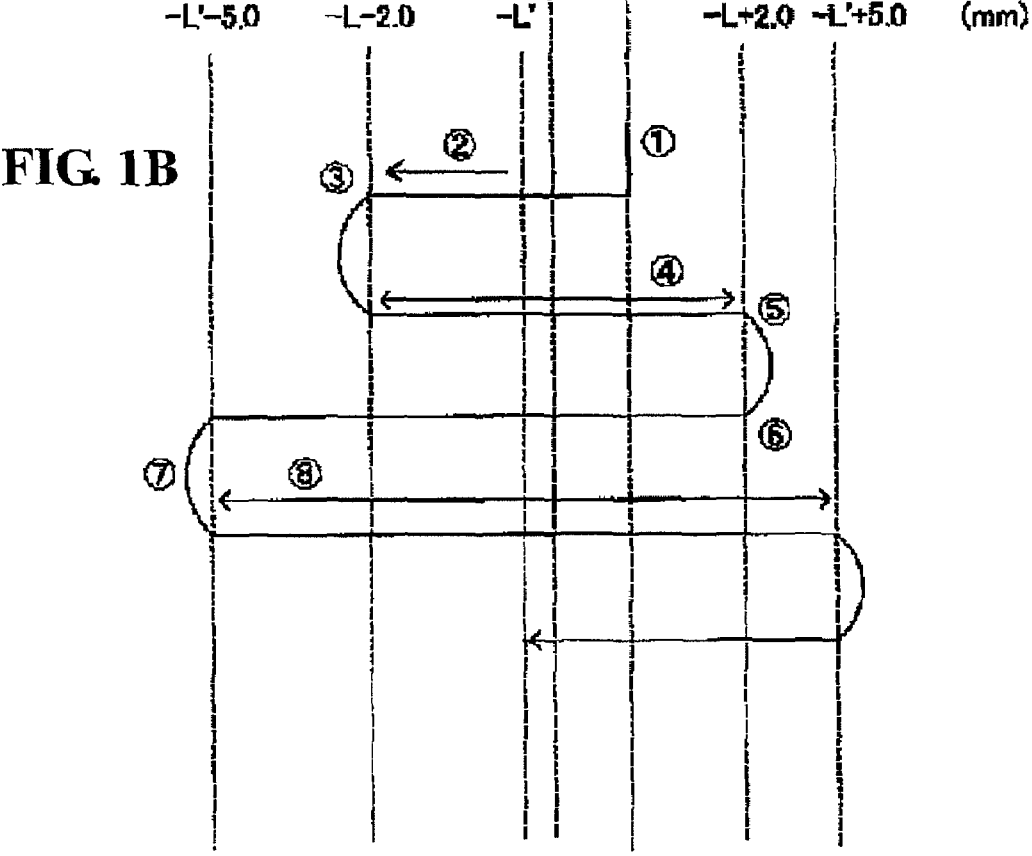
Figure 5:
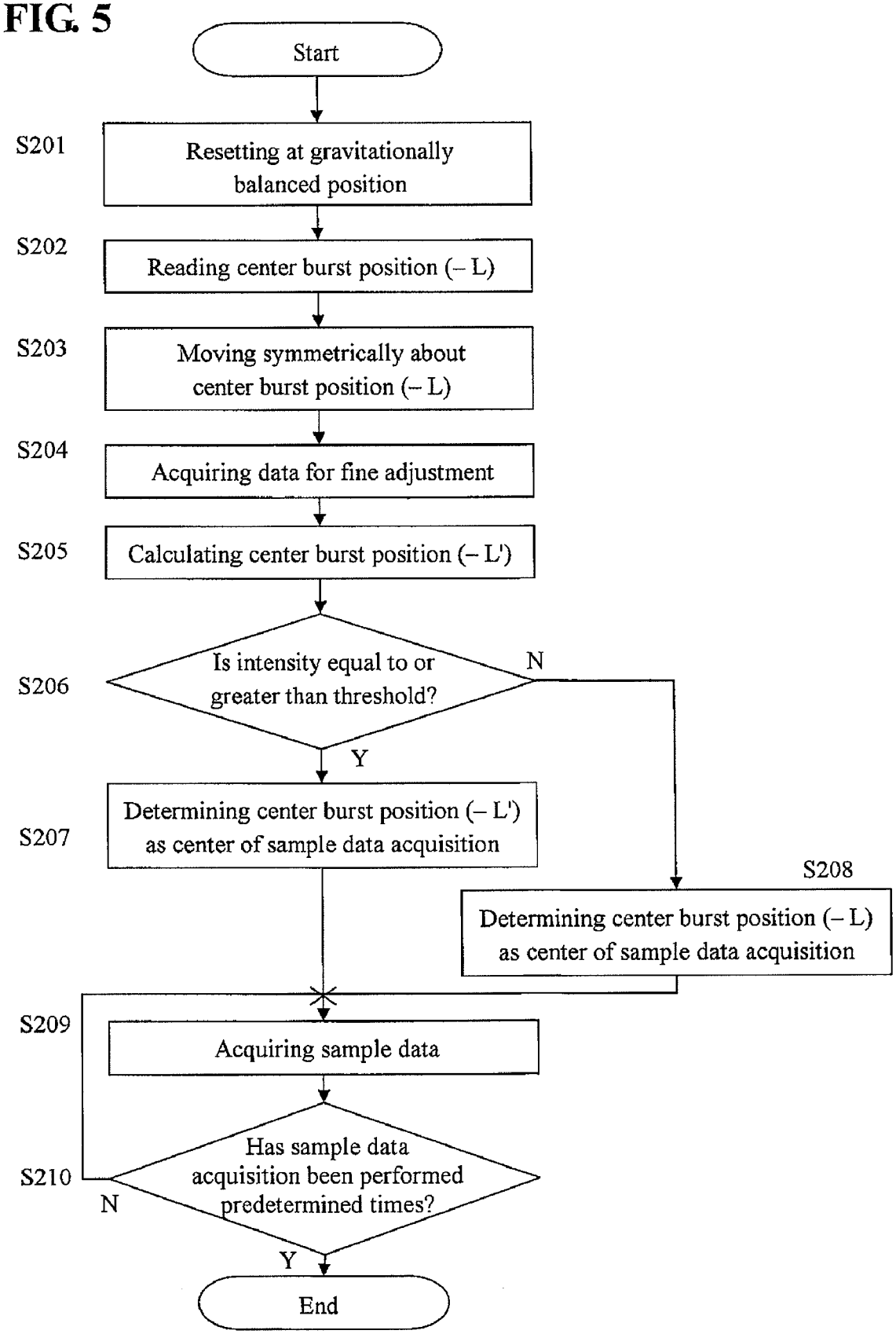
FIG. 5 is an explanatory flowchart of a fine-adjustment/sample measurement operation in the FTIR according to the embodiment.
Figure 6A:
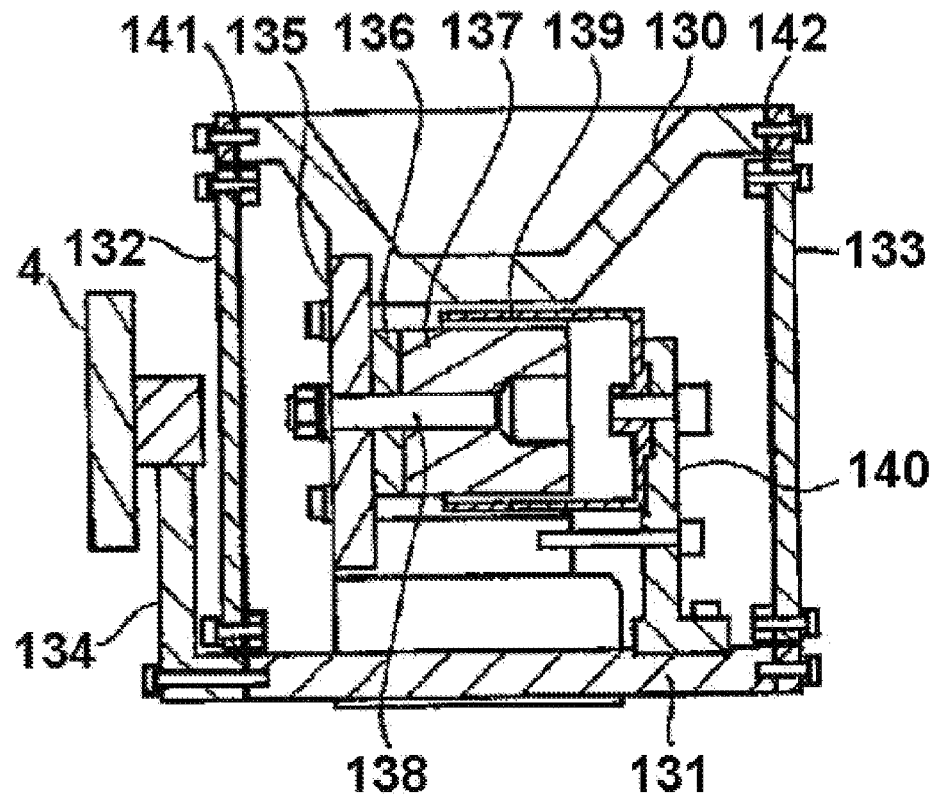
FIGS. 6A and 6B are, respectively, a vertical sectional view and a left side view, which show one example of a movable-mirror sliding mechanism together with a movable mirror swingably hung thereon.
Figure 6B:
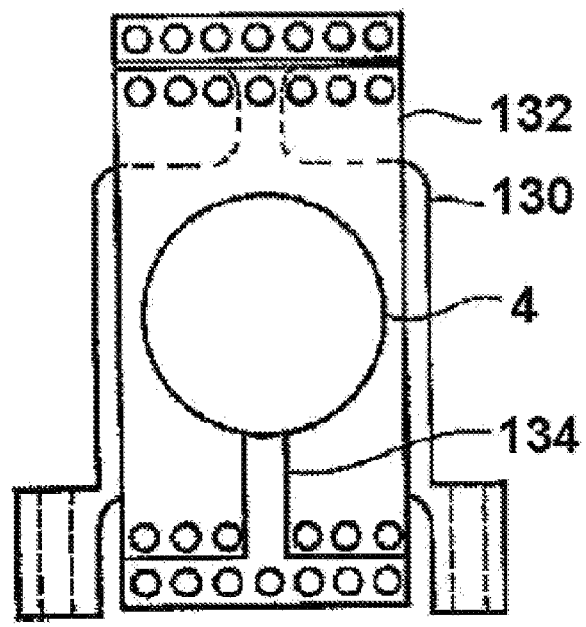
Figure 7:
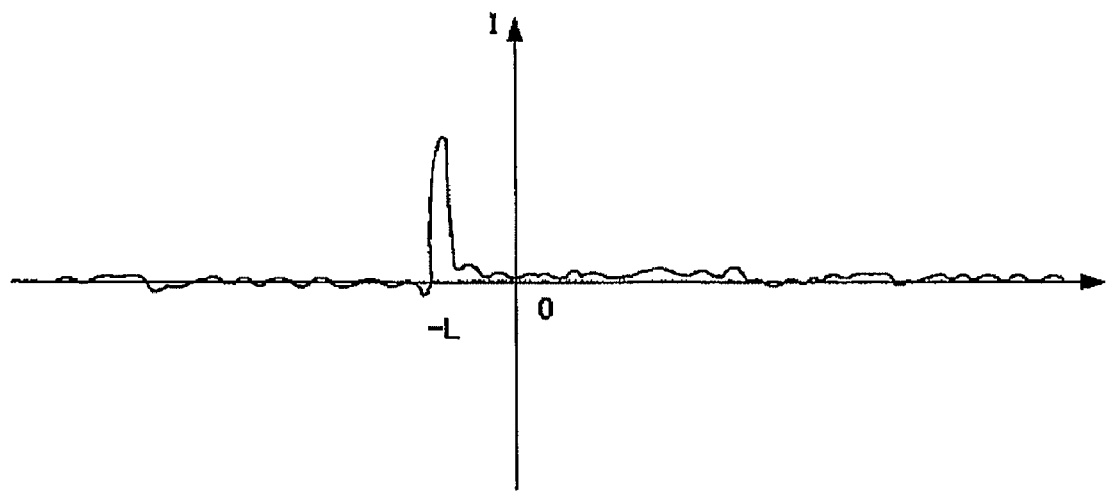
FIG. 7 is a chart showing one example of an interferogram.
Figure 8:
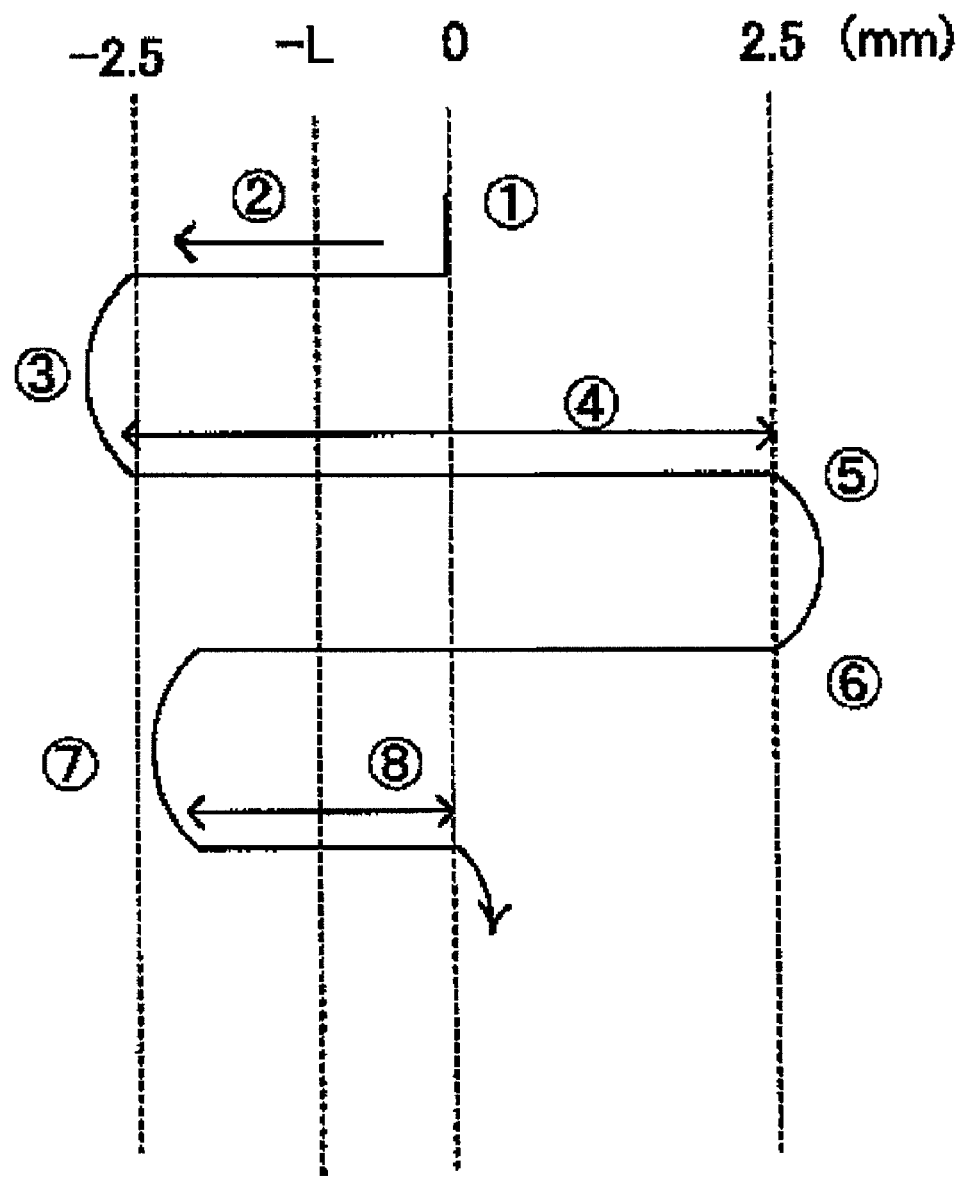
FIG. 8 is an explanatory diagram showing an operation of detecting a center burst position in a conventional FTIR.
Figure 9:
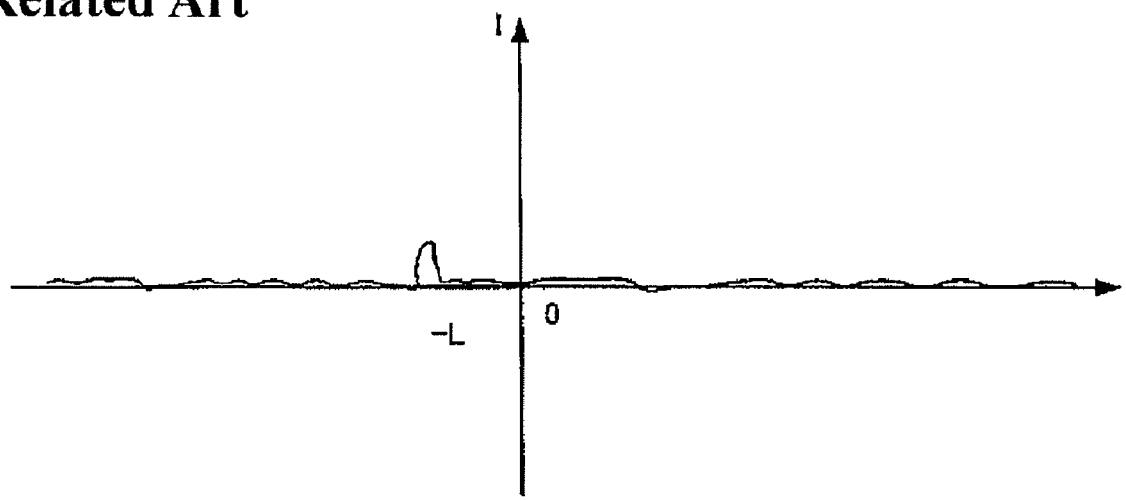
FIG. 9 is a chart showing one example of an interferogram.

The sample measurement operation will be described below with reference to FIG. 5 and FIG. 1B. FIG. 5 is an explanatory flowchart of the sample measurement operation in the FTIR 100 according to the embodiment. When the MPU 63 receives an instruction signal for performing the sample measurement operation from the data-acquisition application operating PC 65, the routine illustrated in this flowchart is called and executed by the MPU 63. Considering that a desirable center burst position is likely to deviate from the aforementioned candidate center burst position due to a slight change in mounted posture of the FTIR 100 after the pre-adjustment operation described in connection with FIG. 4, the sample measurement operation includes a fine-adjustment operation to be performed in advance of an actual sample measurement operation so as to finely adjust the candidate center burst position.

In Step S201, positional data of the movable mirror managed by the up/down counter 60 is initialized (i.e., reset to "0") under the condition that the movable mirror 4 is stopped at a gravitationally balanced position (1). FIG. 1B is an explanatory diagram in which the center burst position is detected when a wavenumber resolution is 4 $cm^{-1}$ and the sample is measured when a wavenumber resolution is 2 $cm^{-1}$.

Subsequently, in Step S202, the candidate center burst position (−L) is read from the EEPROM 62 serving as the center-burst-position storage section 108.

Then, in Step S203, the movable mirror 4 is slidingly moved away from the beam splitter 1 (in the (−) direction) by a sum of a distance corresponding to a wavenumber resolution of 4 $cm^{-1}$ (about −2.0 mm; an up/down counter value=4096 points), a distance for stably reversing the sliding direction (up/down counter value=500 points) and a distance corresponding to an up/down counter value for the candidate center burst position (−L) (i.e., an up/down counter value corresponding to a distance between the gravitationally balanced position (1) and the candidate center burst position (−L)) stored in the EEPROM 62. Thus, when the movable mirror 4 is slidingly moved by a distance corresponding to a sum of an up/down counter value of 8692 points and the up/down counter value for the candidate center burst position (−L), the sliding direction is reversed.

Then, in Step S204, the movable mirror 4 is slidingly moved over a distance (4) corresponding to a wavenumber resolution of 4 $cm^{-1}$ (about 4 mm; an up/down counter value=8192 points), so as to perform an operation of acquiring data for finely adjusting the candidate center burst position. In conjunction with the fine-adjustment data acquisition operation, when the sliding direction is fully reversed and the up/down counter value reaches a sum of 16384 points and the up/down counter value for the candidate center burst position (−L), in the (−) direction, the first center-burst-position fine-adjustment section 109 starts storing data converted by the A/D converter 37, in the sampling buffer area of the data storage memory 61.

Then, in Step S205, after the sliding direction is reversed at a position (6), the movable mirror 4 is slidingly moved, and the first center-burst-position fine-adjustment section 109 calculates a finely-adjusted center burst position (−L') (a position where an interferogram obtained during the fine-adjustment data acquisition operation has a maximum intensity value) and an intensity of the interferogram at the finely-adjusted center burst position (−L').

Then, in Step S206, the first center-burst-position fine-adjustment section 109 determines whether the intensity at the finely-adjusted center burst position (−L') is equal to or greater than the intensity threshold stored in the EEPROM 62. When it is determined that the intensity at the finely-adjusted center burst position (−L') is equal to or greater than the intensity threshold, the finely-adjusted center burst position (−L') is determine as a center of a moving range for a sample data acquisition operation (i.e., the actual sample measurement operation), in Step S207.

If it is determined that the intensity at the finely-adjusted center burst position (−L') is less than the intensity threshold, the candidate center burst position (−L) stored in the EEPROM 62 will be determined as a center of a moving range for the sample data acquisition operation, in Step S208.

Then, in Step S209, the measurement-start-position determination section 107 starts the sample data acquisition operation in the moving range having a center set at the determined center burst position. The sample data acquisition operation may be repeated plural times to perform a processing of correcting a positional deviation of the movable mirror in each of a plurality of interferograms obtained through the operations, adding intensities of the interferograms to produce a cumulative interferogram and calculating a finely-adjusted center burst position based on the cumulative interferogram, in the same manner as that in the pre-adjustment operation.

Then, in Step S210, it is determined whether the number of actual sample measurement operations reaches a predetermined value. If it is determined that the number of actual sample measurement operations does not reach the predetermined value, the routine will return to Step S209.

When it is determined that the number of actual sample measurement operations reaches the predetermined value, the routine is terminated.

An advantageous embodiment of the present invention has been shown and described. It is understood that the present invention is not limited to the above embodiment, but various modifications and changes may be made therein without departing from the spirit and scope of the present invention. For example, (1) The FTIR 100 according to the above embodiment is configured to perform the data acquisition operation (i.e., addition processing) two times. Alternatively, the FTIR may be configured to perform the data acquisition operation three times or more; and (2) In place of Steps S205 to S208 in the FTIR according to the above embodiment, when the sliding direction is reversed at the position (6) after the movable mirror 4 is moved by a distance corresponding to a sum of an up/down counter value of 16884 points and the up/down counter value for the candidate center burst position (−L), to obtain an interferogram, a center burst position may be re-calculated based on a position where a specific region of the interferogram corresponding to a search range having a center set at the candidate center burst position (−L) has a maximum intensity value.

As above, the present invention is effectively usable in an FTIR designed to control a movable mirror based on a quadrature control system.

What is claimed is:

1. A Fourier transform infrared spectrophotometer comprising:
   a main interferometer section operable to perform a sample measurement operation, said main interferometer section including a beam splitter, a fixed mirror, a movable mirror, and a phase plate disposed between said beam splitter and either one of said fixed and movable mirrors;
   a control interferometer section having a quadrature control system for separating two types of polarization components from an interference signal combined through said beam splitter, and detecting said separated polarization components so as to calculate a position of said movable mirror based on a phase relationship between the detection signals and respective wavenumbers of the detection signals;
   means for hangingly supporting said movable mirror in such a manner as to set an initial position of said movable mirror at a gravitationally balanced position;
   a center-burst-position detection section operable, based on an input of a plurality of interference signals from said control interferometer section and a plurality of interferograms from said main interferometer section, to subject respective intensities of said interferograms to an addition processing while correcting a positional deviation of said movable mirror in each of said interferograms, so as to obtain a cumulative interferogram, and detecting a center burst position having a maximum intensity value in said cumulative interferogram;

a center-burst-position storage section operable to store said detected center burst position; and a measurement-start-position determination section operable, based on said center burst position stored in said center-burst-position storage section, to determine a measurement start position of said movable mirror during said measurement operation.

2. The Fourier transform infrared spectrophotometer as defined in claim 1, wherein said plurality of interference signals and said plurality of interferograms are obtained during a pre-adjustment operation and input into said center-burst-position determination section, respectively, from said control interferometer section and said main interferometer section.

3. The Fourier transform infrared spectrophotometer as defined in claim 2, wherein said center-burst-position storage section stores an intensity threshold for an interferogram, wherein said Fourier transform infrared spectrophotometer includes a center-burst-position fine adjustment section operable, in conjunction with said sample measurement operation, to perform a fine-adjustment operation of obtaining an interferogram, and re-calculating a center burst position based on said intensity threshold, and intensities of said obtained interferogram.

4. The Fourier transform infrared spectrophotometer as defined in claim 2, which includes a center-burst-position fine-adjustment section operable, in conjunction with said sample measurement operation, to perform a fine-adjustment operation of obtaining an interferogram, defining a search range for searching a center burst position in said obtained interferogram, and re-calculating a center burst position based on intensities in a specific region of said interferogram corresponding to said search range.

* * * * *